(12) United States Patent
Pentek et al.

(10) Patent No.: US 11,940,569 B2
(45) Date of Patent: Mar. 26, 2024

(54) METHOD FOR DETERMINING EXTRINSIC CALIBRATION PARAMETERS FOR A MEASURING SYSTEM

(71) Applicants: Centre National de la Recherche Scientifique, Paris (FR); YellowScan, Montferrier-sur-Lez (FR); Université de Montpellier, Montpellier (FR)

(72) Inventors: Quentin Pentek, Montpellier (FR); Tristan Allouis, Montpellier (FR); Christophe Fiorio, Montpellier (FR); Olivier Strauss, Montpellier (FR)

(73) Assignees: Yellowscan, Montferrier-sur-lez (FR); Universite de Montpellie, Montpellier (FR); Centre National De La Recherche Scientifique, Paris (FR)

( * ) Notice: Subject to any disclaimer, the term of this patent is extended or adjusted under 35 U.S.C. 154(b) by 256 days.

(21) Appl. No.: 17/597,686

(22) PCT Filed: Jul. 3, 2020

(86) PCT No.: PCT/FR2020/051184
§ 371 (c)(1),
(2) Date: Jan. 18, 2022

(87) PCT Pub. No.: WO2021/009431
PCT Pub. Date: Jan. 21, 2021

(65) Prior Publication Data
US 2022/0276359 A1    Sep. 1, 2022

(30) Foreign Application Priority Data

Jul. 16, 2019   (FR) ...................................... 1908004

(51) Int. Cl.
*H04N 7/18*       (2006.01)
*G01S 7/497*      (2006.01)
(Continued)

(52) U.S. Cl.
CPC .............. *G01S 7/497* (2013.01); *G01S 17/86* (2020.01); *G01S 17/89* (2013.01); *G06T 7/55* (2017.01);
(Continued)

(58) Field of Classification Search
CPC .......... G01S 7/497; G01S 17/86; G01S 17/89; G06T 7/80; G06T 7/55; G06T 2207/10028; H04N 7/002; H04N 7/18
(Continued)

(56) References Cited

U.S. PATENT DOCUMENTS 10,859,684 B1 *  12/2020  Nabatchian ............... G06T 7/13
11,213,189 B2 *   1/2022  Maas .................... A61B 1/0615
(Continued)

OTHER PUBLICATIONS

International Search Report for International Application No. PCT/FR2020/051184 dated Sep. 15, 2020, 2 pages.
(Continued)

*Primary Examiner* — Trang U Tran
(74) *Attorney, Agent, or Firm* — TraskBritt

(57) ABSTRACT

A method for calibrating a measuring system, the system comprising an image capture device, a laser scanner, and a positioning unit, wherein the method comprises preparing at least two images supplied by the image capture device and preparing a 3D point cloud; identifying at least one homologous point in the images and performing an optimization sequence for determining at least one calibration parameter of the measuring system. The sequence comprises at least one iteration of the following steps: for each image, identifying, in the 3D point cloud, at least one close point projecting in a neighborhood of the homologous point of the image; performing a measurement of the distance separating (Continued)

the close points respectively associated with the images; and adjusting the calibration parameter according to the measurement performed.

20 Claims, 6 Drawing Sheets

(51) Int. Cl.
    *G01S 17/86*     (2020.01)
    *G01S 17/89*     (2020.01)
    *G06T 7/55*     (2017.01)
    *G06T 7/80*     (2017.01)
    *H04N 17/00*     (2006.01)

(52) U.S. Cl.
    CPC .............. *G06T 7/80* (2017.01); *H04N 17/002* (2013.01); *G06T 2207/10028* (2013.01)

(58) Field of Classification Search
    USPC ......................................................... 348/135
    See application file for complete search history.

(56) References Cited

U.S. PATENT DOCUMENTS

| | | | |
|---|---|---|---|
| 11,610,337 B2* | 3/2023 | Habib | B64C 39/024 |
| 11,640,673 B2* | 5/2023 | Wirth | G06T 7/85 |
| | | | 382/154 |
| 2017/0122736 A1* | 5/2017 | Dold | G01S 7/4811 |
| 2017/0261999 A1 | 9/2017 | Van Voorst | |
| 2018/0232947 A1 | 8/2018 | Nehmadi et al. | |
| 2018/0315214 A1 | 11/2018 | Beinschob | |
| 2018/0372852 A1* | 12/2018 | Gui | G01S 7/497 |
| 2020/0150275 A1* | 5/2020 | Zhu | G06T 7/10 |
| 2021/0003684 A1* | 1/2021 | Gong | G01S 17/931 |

OTHER PUBLICATIONS

International Written Opinion for International Application No. PCT/FR2020/051184 dated Sep. 15, 2020, 6 pages.

Karami et al., Image Matching Using SIFT, SURF, BRIEF and ORB: Performance Comparison for Distorted Images, In Proceedings of the 2015 Newfoundland Electrical and Computer Engineering Conference, St. johns, Canada, November, (2015), 5 pages.

Katzenbeisser et al., About the Calibration of Lidar Sensor, ISPRS Workshop 3_D Reconstruction form Airborne Laser-Scanner and InSAR data; (Oct. 8-10, 2003), 6 pages.

Merriaux et al., Synchronisation et calibrage entre un Lidar 3D et une centrale inertielle pur la localisation précise d'un vehicule autonome, Geolocalisation et Navigation, https://hal.archives-ouvertes.fr/hal-01757933, Submitted on : Wednesday, Apr. 4, 2018, 5 pages.

\* cited by examiner

METHOD FOR DETERMINING EXTRINSIC CALIBRATION PARAMETERS FOR A MEASURING SYSTEM

CROSS-REFERENCE TO RELATED APPLICATIONS

This application is a national phase entry under 35 U.S.C. § 371 of International Patent Application PCT/FR2020/051184, filed Jul. 3, 2020, designating the United States of America and published as International Patent Publication WO 2021/009431 A1 on Jan. 21, 2021, which claims the benefit under Article 8 of the Patent Cooperation Treaty to French Patent Application Serial No. 1908004, filed Jul. 16, 2019.

TECHNICAL FIELD

The present disclosure relates to a method for determining extrinsic calibration parameters of a measuring system comprising an image capture device and a laser scanner.

BACKGROUND

A laser scanner (sometimes also referred to by the term "LIDAR") is a telemetry device that allows the profile or the contour of objects constituting a scene to be provided in the form of a 3D point cloud. The laser scanner emits a light beam that is reflected by an object in the scene. The distance between the optical emission center of the scanner and the point of reflection on the illuminated object is determined from the flight time, i.e., the time between the emission of the beam and the reception of the reflected beam.

The laser scanner is sometimes provided with means that allow the beam to be oriented in a specific direction, for example, a rotating mirror, the movement of which makes it possible to scan a part of the scene with the beam. Furthermore, the laser scanner can be carried, e.g., by a vehicle, such as a motor vehicle or an aircraft, which is capable of moving. In this way, information on the distance between the laser scanner and objects in the scene can be captured, even if this scene is geographically large.

In such a measuring system, the laser scanner is associated with a positioning unit that makes it possible to geo-locate the scanner and determine the attitude thereof. The distance information provided by the laser scanner can then be combined with that provided by the unit (position, attitude) to create the 3D point cloud. Each point of the cloud can be placed in a georeferenced frame of reference. In this way, the contour and/or the profile of the objects in the scene can be recreated.

As shown in the article "About the calibration of LIDAR sensors" by R. Katzenbeisser ("3-D Reconstruction form Airborne Laser-Scanner and InSAR data" ISPRS Workshop, 2003), this combination of information requires a very precise calibration of the measuring system. This precise calibration, in particular, requires the determination of the relative mounting position between the geolocation unit and the laser scanner. There are many methods for performing this calibration; see, for example, "Synchronisation et calibrage d'un LIDAR 3D et d'une centrale inertielle pour la localisation precise d'un véhicule autonome" [Synchronization and calibration of a 3D LIDAR and an inertial unit for precise location of an autonomous vehicle] by P. Merriaux et al (URSI-France "Journées scientifiques" conference (Géolocalisation et Navigation dans l'Espace et le Temps [Geolocation and Navigation in Space and Time]), March 2018, Meudon, France).

Some measuring systems also include, in addition to the laser scanner and the positioning unit, an image capture device (for example, a still camera, an image sensor, or a video camera). In general, such an image capture device captures light radiation coming from the scene in a given spectral region to form a 2D image. The spectral region can be the visible spectral region and it is thus possible to collect information on the color and/or texture of the scene. It is possible for the spectral region to be different, for example, in the infrared region so that temperature information can be captured.

Whatever the nature of the 2D images provided by the image capture device built into the measuring system, the aim is generally to "fusion" the information included in the images with that of the 3D point cloud created from the data provided by the laser scanner in order to associate a piece of information, for example, concerning color or temperature, with the points of the 3D cloud.

To allow the fusion of these data, it is necessary to determine the relative position between the image capture device and the laser scanner, i.e., the position and the orientation of one of these elements in a frame of reference associated with the other element.

The document US2018315214 proposes a solution that aims to solve this calibration problem, but this solution is not entirely adequate. In this solution, so-called "remission" images formed using the intensity of the return beam from the laser scanner first have to be created, and the remission images have to be matched directly to those provided by the image capture device. However, this intensity information is not always available and/or of sufficient quality. Moreover, to make the solution sufficiently precise, the remission images must have a high spatial resolution. In practice, the method for determining calibration parameters proposed by this document is limited to measuring systems comprising a very specific laser scanner.

BRIEF SUMMARY

An aim of the present disclosure is to propose an alternative method to that proposed in the prior art that does not require the creation of remission images. More generally, the present disclosure proposes a method for calibrating a measuring system that is simple to implement and that can be applied to a measuring system including a wide variety of laser scanners.

With a view to achieving this aim, the present disclosure proposes a method for calibrating a system comprising an image capture device, a laser scanner, and a positioning unit, the method comprising:
  preparing at least two images supplied by the imaging device, the images representing at least one common scene captured from different points of view, and preparing a 3D point cloud of the common scene created using the data supplied by the laser scanner and by the positioning unit;
  identifying at least one homologous point in the images, the homologous point forming the same point of the common scene; and
  an optimization sequence for determining at least one calibration parameter.

The optimization sequence includes at least one iteration of the following steps:

for each image, identifying, in the 3D point cloud, at least one close point that projects into a neighborhood of the homologous point of the image;

establishing a measurement of the distance separating the close points associated with the images; and adjusting the calibration parameter according to the established measurement.

In the absence of any measurement errors, a point of the 3D point cloud should be projected in the various images provided by the image capture device at the same common point of a scene. The present disclosure cleverly takes advantage of this observation to determine, by way of an optimization sequence that uses numerical processing of the images and of the 3D point cloud, at least one calibration parameter of the image capture device that best ensures this result.

According to other advantageous and non-limiting features of the present disclosure, used alone or in any technically feasible combination:

- a laboratory-estimated value of the calibration parameters is used during a first iteration of the optimization sequence;
- the calibration parameters of the scanner device are provided with respect to the positioning unit and the calibration parameter is a rotation matrix and/or a translation vector connecting a frame of reference associated with the image capture device to a frame of reference associated with the positioning unit;
- the calibration parameter is a rotation matrix and/or a translation vector connecting a frame of reference associated with the imaging device to a frame of reference associated with the laser scanner;
- the two images were acquired while the measuring device was completing a trajectory comprising an outward portion and a return portion that correspond to one another;
- the preparation of the images comprises determining the location and the attitude of the measuring system at a capture moment of each image;
- the step of identifying at least one homologous point comprises determining characteristic points and characteristic point descriptors;
- the optimization sequence uses a simplex method, a gradient method, or a stochastic method;
- the at least one close point that projects into the neighborhood of the homologous point is identified by selecting, from the 3D point cloud, the point projecting closest to the homologous point;
- the at least one close point that projects into the neighborhood of the homologous point is identified by selecting, from the 3D point cloud, the points projecting in a perimeter of R pixels around the homologous point;
- the measurement of the distance is established using a barycenter calculation of the close points associated with each image; and
- the measurement of the distance is established using a calculation of the Hausdorff distance between the close points of the images.

BRIEF DESCRIPTION OF THE DRAWINGS

Other features and advantages of the present disclosure can be found in the detailed description of embodiments the present disclosure below, which makes reference to the accompanying drawings, in which.

DETAILED DESCRIPTION

Measuring System

Figure 1:
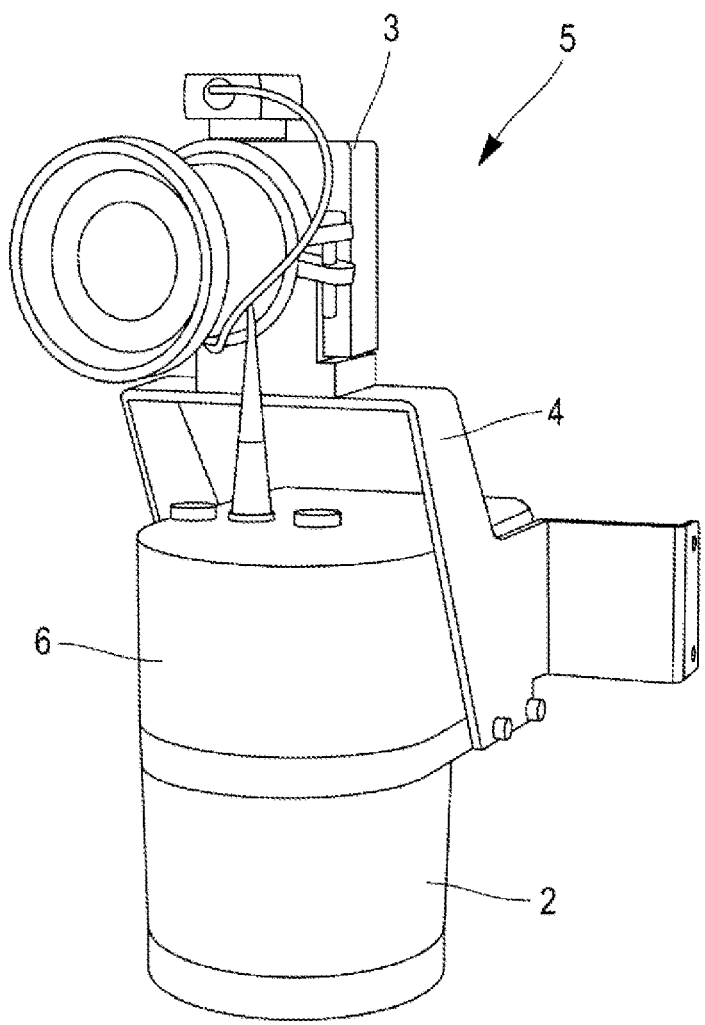
FIG. 1 shows a measuring system that can make use of a method according to the present disclosure.

FIG. 1 shows a measuring system 5 that can make use of a method according to the present disclosure. This system 5 comprises a laser scanner 2 and an image capture device 3. The laser scanner 2 here includes a positioning unit 6 (hereinafter referred to as INS (Inertial Navigation System) for the sake of simplicity) capable of providing time-stamped location data (altitude, latitude, longitude) and attitude (course, roll, and pitch). The INS unit combines a geolocation device (of the GNSS type) and an inertial navigation system for this reason. The INS unit can be associated with an antenna, carried by a vehicle on which the measuring system 5 is based, for example. The location and attitude data can be provided in a temporally regular manner, for example, every 10 to 20 milliseconds. The laser scanner 2, the INS unit 6, and the image capture device 3 are joined together with no degree of freedom by way of a frame 4 in the example shown. Together they constitute a measuring system 5 that can be placed on a vehicle 1, for example, by way of the frame 4. They are also functionally linked to one another so as to be able to exchange the information necessary for their operation. The measuring system 5 can comprise an energy source, such as a battery, or can be linked to such a source, for example, when the source is carried by a vehicle.

Figure 2:
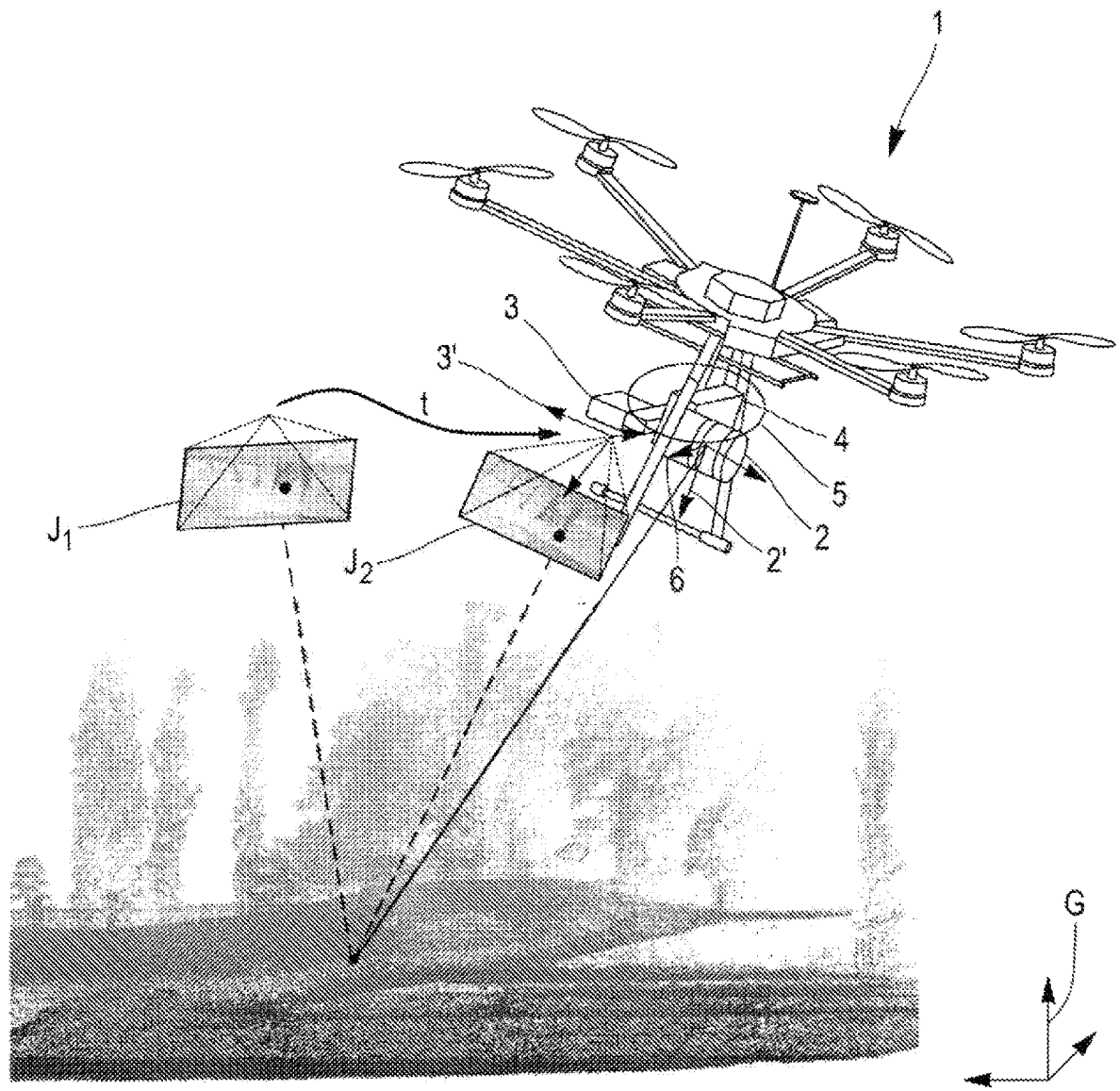
FIG. 2 shows a measuring system carried by a vehicle during a measurement campaign.

With reference to FIG. 2, the measuring system 5 can be associated with a vehicle 1 such as an aircraft in order to carry out a measurement campaign. The vehicle 1 moves along a trajectory t, during which the image capture device 3 can be actuated to produce images $J_1$, $J_2$ of a scene.

During the movement of the vehicle 1 along the trajectory t, the laser scanner 2 captures distance data by scanning the scene using a light beam, the orientation of which is also captured. At the same time, the INS unit 6 captures the location and attitude data from the measuring system 5.

The data captured by the various devices constituting the measuring system 5 (images, distance and orientation of the beam, location, attitude) are all identified temporally by way of time-stamping information that can be provided by the GNSS atomic clock of the INS unit 6, for example. These data can be stored in the system 5 or uploaded to a base station located near the scene. For this reason, the measuring system 5 can include or be linked to a telecommunications unit capable of exchanging, uploading, or downloading any type of data together with this base station.

The images $J_1$, $J_2$ are referenced in a first frame of reference 3' associated with the image capture device 3, and the center of which frame of reference is placed at the optical center of this device 3. The intrinsic parameters of the image capture device 3 are provided so that it is possible to connect a point arranged in the first frame of reference 3' to the coordinates of a point or of a pixel of an image.

Similarly, the distance data captured by the laser scanner 2 are referenced in a second frame of reference 2' of which the center is placed at the optical center of the scanner 2. The intrinsic parameters of the laser scanner 2 are also provided so that it is possible to link the distance and orientation data of the measurement beam to a point arranged in the second frame of reference 2'.

Finally, the INS unit 6 is associated with a third frame of reference and forms the center of the frame of reference. The location and attitude data supplied by the unit 6 make it possible to identify the position and angle of the measuring system 5 in a georeferenced frame of reference G.

Figure 3:
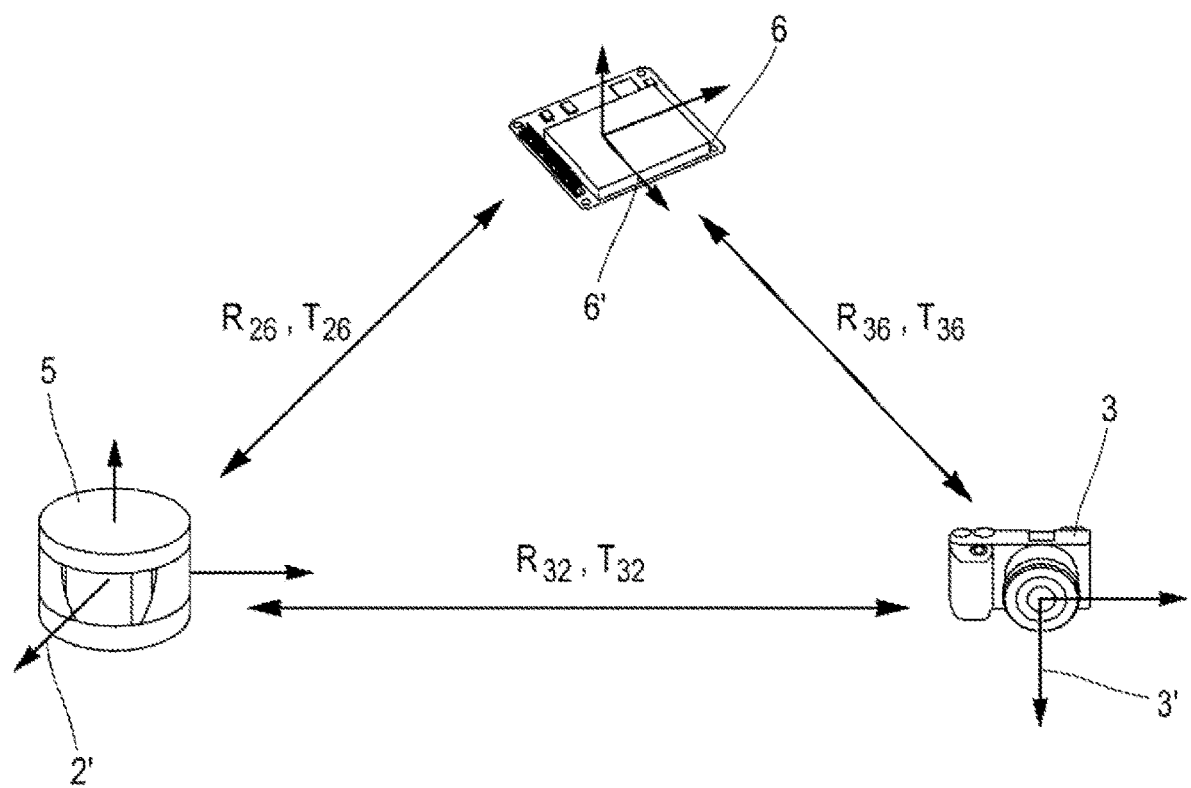
FIG. 3 schematically shows the extrinsic calibration parameters of the measuring system.

FIG. 3 schematically shows the extrinsic calibration parameters of the measuring system 5, i.e., the parameters determining the existing transformation between a frame of reference 2', 3' associated with a device 2, 3 of the system and an absolute frame of reference, formed here by the third frame of reference 6' associated with the INS unit 6. Thus, the second frame of reference 2' associated with the laser scanner 2 is linked to the third frame of reference 6' of the INS unit 6 by a translation vector $T_{26}$ and a rotation matrix $R_{26}$. Similarly, the first frame of reference 3' associated with the image capture device 3 is linked to the third frame of reference 6' by a translation vector $T_{36}$ and a rotation matrix $R_{36}$. Finally, the first frame of reference 3' is associated with the second frame of reference 2' by a translation vector $T_{32}$ and a rotation matrix $R_{32}$. Each pair (rotation matrix, translation vector) defines a relative mounting position between two elements and forms extrinsic calibration parameters of the measuring system 5.

The processing of the data captured by all of the devices 2, 3, 6 making up the measuring system 5 makes use of the calibration parameters.

Thus, the data captured by the laser scanner 2 are first identified in the second frame of reference 2', then projected into the third frame of reference 6' using the extrinsic parameters $R_{26}$, $T_{26}$ of the laser scanner 2. The data provided by the INS is then used to locate these data in the georeferenced frame of reference G. As indicated in the introduction to this application, the calibration parameters $R_{26}$, $T_{26}$ of the laser scanner 2 can be established with precision using one of the methods known from the prior art.

To project the data, for example, color or temperature data, provided by the images $J_1$, $J_2$ on the 3D point cloud, the calibration parameters $R_{32}$, $T_{32}$ of the image capture device 3 are likewise required. These calibration parameters can be estimated by measurement in a laboratory, for example, by measuring the distances and angles separating the different elements of the measuring system 5. However, this estimate does not provide the required precision.

The remainder of the present description discloses a method that allows these calibration parameters to be established simply.

It is noted in the preamble that, the measuring system 5 being constituted by the rigid assembly of the measuring devices 2, 3, 6, the following relationship is provided:

$$R_{36}=R_{32} \cdot R_{26}*$$

$$T_{36}=T_{32}+R_{32} \cdot T_{26}$$

Consequently, it is possible to choose either to establish the calibration parameters $R_{36}$, $T_{36}$ or the calibration parameters $T_{32}$, $R_{32}$, these parameters being linked to one another by the parameters $R_{26}$ and $T_{26}$.

Calibration Method

Figure 4A:
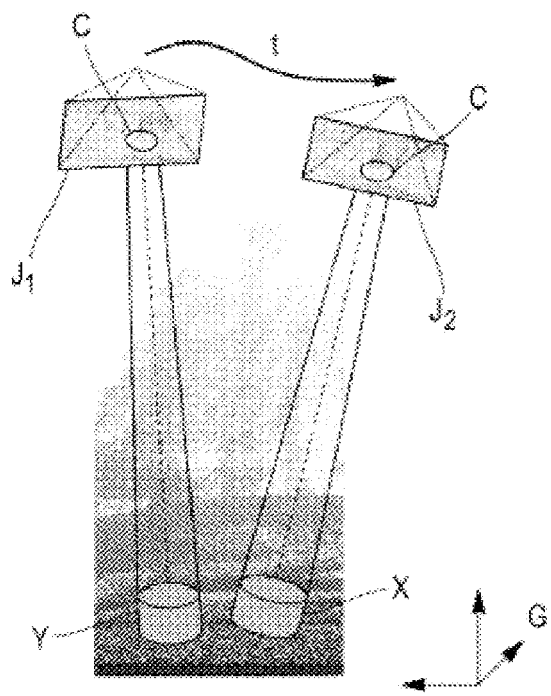
FIGS. 4A and 4B schematically show the underlying principles of a method according to the present disclosure.
Figure 4B:
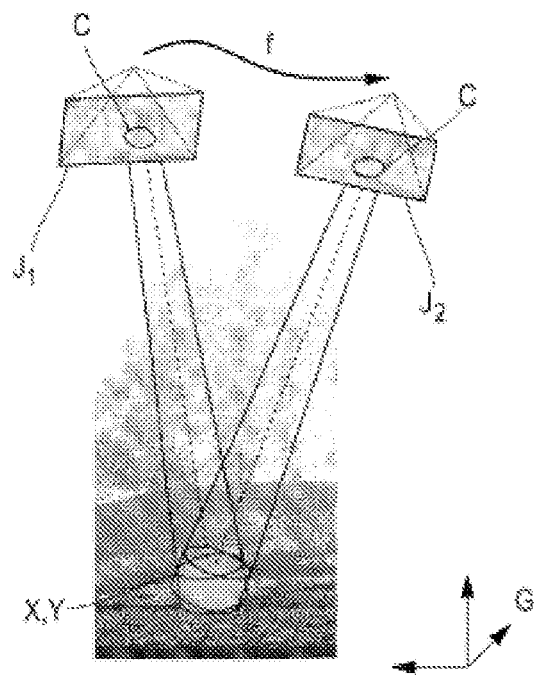

FIGS. 4A and 4B schematically show the principles underlying this method. FIG. 4A shows two images $J_1$, $J_2$ of a common scene C. These images $J_1$, $J_2$ were established by the image capture device 3 during the course of a trajectory t of the measuring system 5. The common scene is therefore represented in these images from different points of view. The projections of the common scene C on the 3D point cloud from the images $J_1$, $J_2$ and using the estimated calibration parameters $T_{36}$, $R_{36}$ of the image capture device 3 provide two sets of 3D points X, Y, respectively, which sets are different from one another. However, the same scene C should be projected onto the same set of 3D points of the point cloud, or at least onto a set of points very close to one another. A method according to the present disclosure implements an optimization sequence that aims to establish the optimal calibration parameters $T_{36}$, $R_{36}$ of the image capture device 3, i.e., those allowing the sets of 3D points X, Y to overlap as much as possible. This "optimal" situation is shown in FIG. 4B.

As a prerequisite for implementing this method, the extrinsic calibration parameters $R_{26}$, $T_{26}$ of the laser scanner 2 and the intrinsic calibration parameters of the image capture device 3 have been established and are available. To recall, the intrinsic parameters of the image capture device 3 make it possible to connect or project a point defined in the first frame of reference 3' in a point or a pixel of an image provided by this device 3.

It is also possible to have a first estimate, for example, by way of a laboratory measurement, of the calibration parameters $R_{36}$, $T_{36}$ of the image capture device 3, although this first estimate is not absolutely necessary.

Step S1 of Data Preparation

Figure 5:
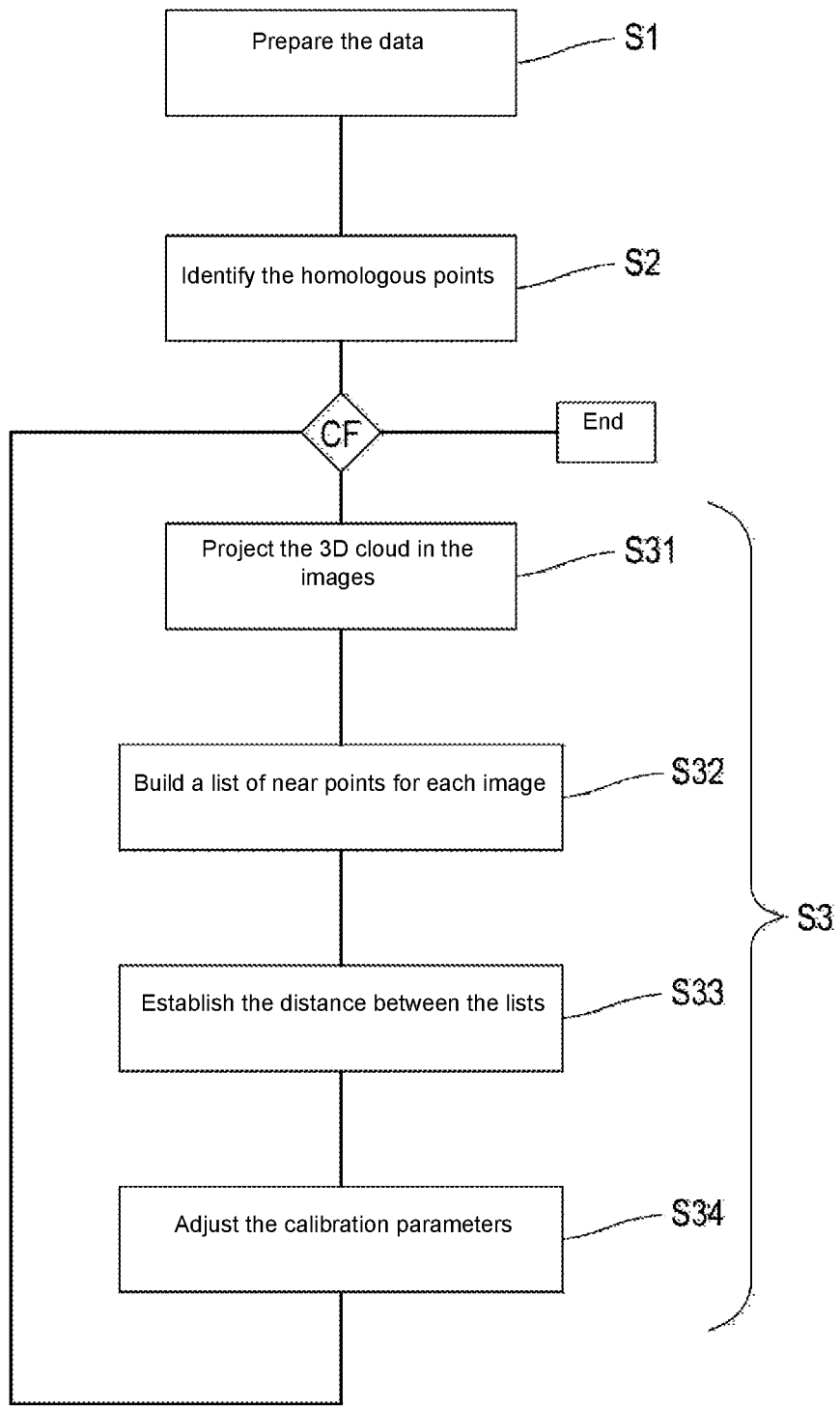
FIG. 5 shows the main steps of a method according to the present disclosure.

With reference to FIG. 5, the calibration method comprises a first step S1 of data preparation.

These data may have been captured during a preliminary measurement campaign, for example, by having the vehicle 1 fitted with the measuring system 5 describe a trajectory, as presented with reference to FIG. 2.

When planning this measurement campaign, the aim is to choose a trajectory t making it possible to capture data that is sufficiently rich and unlikely to include bias. For example, a trajectory made up of an outward portion and a return portion that correspond to one another can be chosen.

During this measurement campaign, images are acquired using the image capture device 3. Some of these images are made to overlap one another, i.e., they comprise a common scene. The trajectory and the capture moments of the measurement campaign will be planned to promote such an overlap, as is naturally the case when the trajectory is made up of an outward portion and a return portion that correspond to one another.

Image overlap need not result from images captured consecutively over time. For example, a first image captured during the outward portion may overlap with an image taken during the return portion of the route.

However, the aim is at least to obtain, among all the images taken during the campaign, a plurality of images representing a common scene captured from different points of view. The term "point of view" refers to the location of the optical center of the image capture device in the georeferenced frame of reference G, and/or the viewing angle of this device in this same frame of reference. During the measurement campaign, the distance measurements are also recorded using the laser scanner 2 and the location and attitude information is recorded using the INS unit 6 at the same time as the images are captured.

Figure 6:
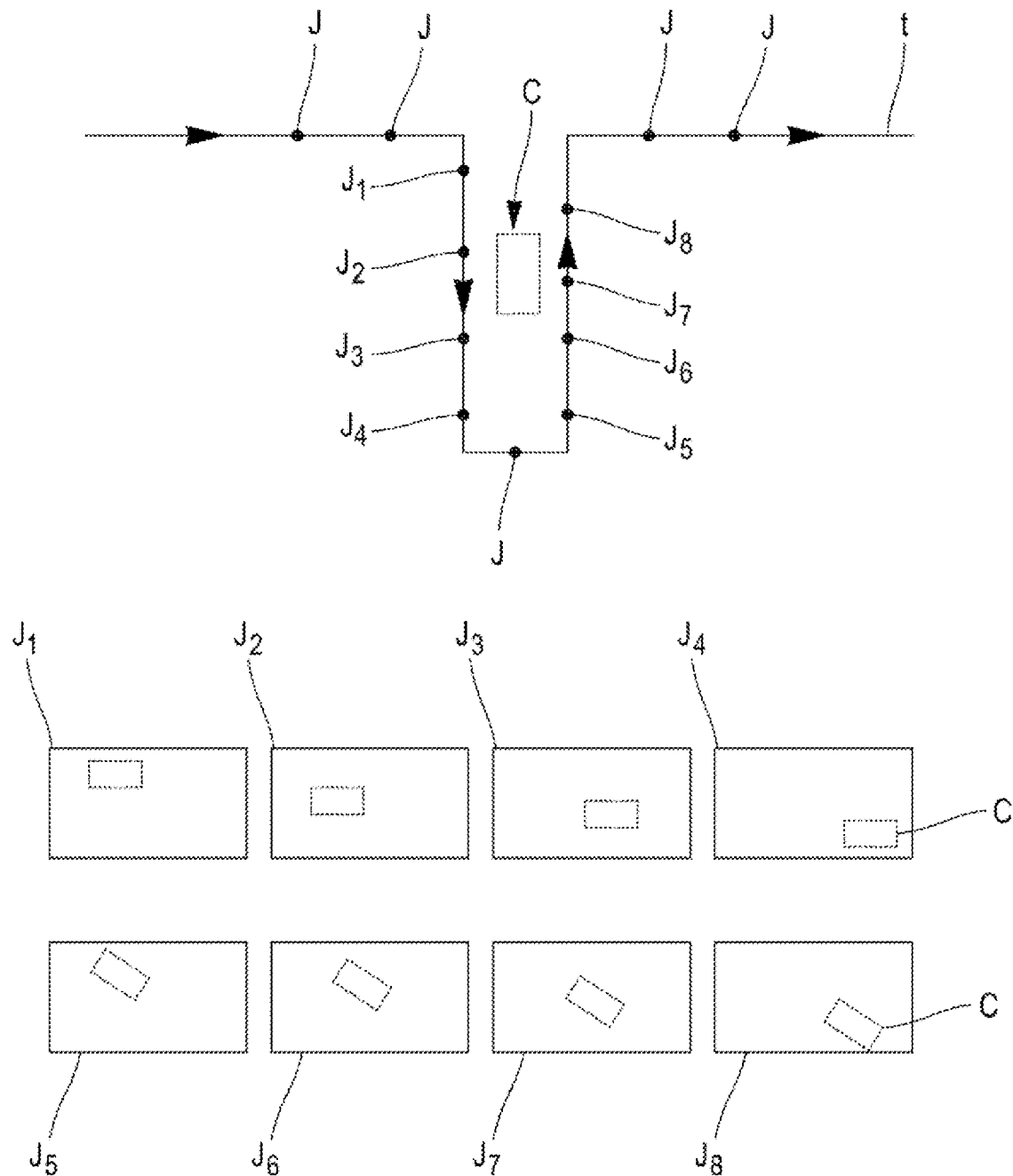
FIG. 6 shows images of a common scene captured from different points of view during a measurement campaign.

By way of illustration, FIG. 6 shows an example of a measurement campaign. During this campaign, the aircraft 1 of FIG. 2 equipped with the measuring system 5 moves along the trajectory t. This route includes an outward portion and a return portion that correspond to one another and during which images I were produced using the image capture device 3. Among these images, 8 $J_1$-$J_8$ images, comprising a whole common scene C, were selected. The data provided by the laser scanner 2 and the INS unit 6 were also noted during this journey.

The data captured during the measurement campaign are processed during the first step S1 of data preparation. This preparation comprises the selection of a set of images ($J_1$-$J_8$ in the example of FIG. 6) representing a common scene C captured from different points of view. This set of images can be formed from a number N of images, this number being greater than 2. Typically, a number N of images between 4 and 20 will be chosen.

To make it possible to precisely locate the selected images in the georeferenced frame of reference G, the data preparation step comprises determining the location information (altitude, latitude, longitude) and attitude (course, roll, and pitch) of the measuring system 5 at the capture moment of each selected image. To recall, each image provided by the image capture device 3 is time-stamped so that the capture moment is provided. To establish very precise information on the positioning and attitude of an image, a value of this information can be established by interpolation between two pieces of data supplied by the INS unit 6: the data with a time position just before the capture moment and the data with a time position just after the capture moment.

The data preparation step S1 also comprises the creation of the 3D point cloud of the scene from the measurements provided by the laser scanner 2. For this purpose, the extrinsic parameters $T_{26}$, $R_{26}$ of the laser scanner 2 are used to project the measurements made into the third frame of reference 6' associated with the INS unit 6. The data provided by this unit are used to position the points of the 3D cloud in the georeferenced frame of reference G. To simplify the rest of the processing, the 3D point cloud can be processed so as to eliminate the points that do not correspond to the common scene or that are very far away from it.

A 3D point cloud comprising at least the common scene is thus provided at the end of the preparation step S1. A set of images, formed by a number N of images and representing the common scene from different points of view, is also provided. The position and attitude of each point of view is identified.

Step S2 of Identifying Homologous Points

The data preparation step S1 is followed by a step S2 of identifying homologous points in the images in the set of images. The term "homologous point" denotes a point in the common scene that appears in each image that makes up the set of images. A homologous point k is located in each image i of the set of N images by its coordinates $(x^k_i, y^k_i)$ in the image i. It should be noted that these coordinates can be "subpixel," i.e., a homologous point can be placed in a frame of reference linked to the image with a placement resolution higher than that of the pixels of the image.

For the sake of simplicity, the term "homologous point" will be used interchangeably with the point of the common scene or the point of an image corresponding to this point of the common scene.

The search for homologous points in a set of images is a well-known problem in the field of image processing. A person skilled in the art also has many algorithms available to solve this problem numerically, for example, the SIFT ("scale invariant feature transform") method, the SURF ("speed up robust feature") method, the ORB ("oriented FAST and rotated BRIEF") method, or any other similar method. A detailed description of these methods can be found in "Image Matching Using SIFT, SURF, BRIEF and ORB: Performance Comparison for Distorted Images" by Ebrahim Karami, Siva Prasad, and Mohamed Shehata (2015). These methods can be implemented by computer using freely available computer libraries.

In general, these methods involve recording, during a first step, characteristic points within the images and establishing a characteristic point descriptor for each of the points recorded. In a following step, the descriptors of the characteristic points of an image are matched with the descriptors of the characteristic points of another image. Thus, for each pair of images Ii, Ij of the set of N images, it is possible to establish a data structure comprising, for each match identified between these two images, a record $\{(x^k_i, y^k_i), (x^k_j, y^k_j)\}$ of the coordinates of the matched point k. Typically, for well-structured images, such as those captured in a natural environment, k can be greater than 100, for example, between 100 and 5000.

These data structures are established for all possible pairs of images. To improve the quality of the matching of the characteristic points of each image pair, an algorithm can be applied to eliminate the outlier points from the data structure and keep only a reduced structure. This algorithm can be of the RANSAC ("random sample consensus") type.

They can then be combined with one another to form a combined data structure. This data structure comprises a plurality of records, each record $\{(x^1_1, y^1_1), \ldots, (x^1_N, y^1_N)\}$ listing the respective coordinates of the points of the matching N images. If an image does not comprise a matching point, the corresponding field in the record of the combined structure may be left blank or bear a mark making it possible to identify this situation.

In order to obtain at least one homologous point, the sufficiently informed records, i.e., the records describing points that match in M images of the set of N images, M being between 2 and N, are selected in the combined data structure. In other words, the records describing points in at least 2 images of the set of images are selected.

Therefore, at least one homologous point present in the images of a set of images formed by at least two images is provided at the end of this identification step S2. This homologous point corresponds to the same point of the common scene.

There is typically an image set formed by ten images, for example, between 4 and 20. The variable M can be around 3. The data structure of homologous points typically includes several hundred such points, for example, between 50 and 500.

Optimization Step S3

A method for calibrating the image capture device 3 uses the above information during a subsequent optimization step S3.

As has already been stated in relation to FIGS. 4A, 4B, the idea underlying this optimization is that, in the absence of any measurement errors, the homologous points should in principle be projected in the same neighborhood of the 3D point cloud. As has already been seen, this projection uses the calibration parameters $R_{36}$, $T_{36}$ of the image capture device 3. In a method according to the present disclosure, an attempt is made to determine by optimization the extrinsic calibration parameters of the image capture device 3 that best ensure this result.

This optimization can be based on any known numerical approach that is suitable. This may be a so-called "simplex" optimization method, a gradient-based method, or a stochastic method, for example, using simulated annealing or a genetic algorithm. In all cases, the method includes the development of a cost function calculated from an estimate of the parameter to be determined, in this case at least one calibration parameter of the measuring system 5, which is then varied according to the calculated cost value. This sequence of operations is repeated to converge to a parameter value that optimizes the cost function.

In a method according to the present disclosure, the optimization sequence comprises at least one iteration of steps that are described below.

During a first step S31 of the optimization sequence, the 3D cloud is first projected in each of the images forming the set of images selected. In practice, each point of the 3D point cloud is first positioned in the first frame of reference 3' associated with the image capture device 3 and the intrinsic parameters of the image capture device 3 are used to project the points of the 3D cloud in this frame of reference on each of the images. The location and attitude data associated with the image in question and an estimated value of the extrinsic parameters $T_{36}$, $R_{36}$ of the image capture device 3 are used to locate the points of the 3D cloud in the first frame of reference 3'. This value can be that estimated at the end of the previous iteration. For the first iteration, it is possible to choose an estimated value of these parameters that may have been established during a preliminary measurement carried out in the laboratory. In certain cases, for example, when the optimization uses a stochastic method, a random or arbitrary estimated value can be chosen for the first iteration.

In a following step S32 of the optimization sequence, the images are successively processed in order to identify the points of the 3D cloud that are projected in the neighborhood of at least one homologous point of the processed image. In this way, and for each image, a list of points of the 3D cloud is formed, these points being designated as "close." In other words, close points that are projected in the immediate neighborhood of the homologous points of the image are located in the 3D cloud.

There are multiple ways to determine this list of close points for each image.

In this way, and according to a first approach, the point that is closest to a chosen homologous point of the processed image is sought among all the projected points of the 3D point cloud. The corresponding point of the 3D cloud is then placed in the list of close points, and this operation is repeated for all the homologous points of the image. This sequence is repeated for all the images in order to establish as many lists of close points as there are images.

According to an alternative approach, all the points that are in a perimeter of R pixels around a chosen homologous point of the processed image are sought among all the projected points of the 3D point cloud. This number of pixels R is typically between 5 and 30, depending on the spatial density of the 3D point cloud.

The selected points of the 3D cloud are then placed in the list of close points, and, as in the first approach, this operation is repeated for all the homologous points and for all the images.

Preferably, and according to a preferred embodiment of this alternative approach, the selected points of the 3D cloud will only be placed in the list of close points if the number of points projected in the neighborhood of R pixels of a homologous point exceeds a predetermined threshold K (K may be between 5 and 30). In this way, points of the 3D cloud that are isolated, which may be noise, or which may not be representative of the scene, are prevented from being selected from the list of close points.

Whichever approach is adopted, a list of close points is provided for each image at the end of this step. The close points of the 3D cloud correspond approximately to the projection of the homologous points of the image with which the list is associated for the estimated calibration parameters.

In a next step S33 of the optimization sequence, a measurement of the distance separating the lists of close points from one another is produced. It should be understood that, in a purely theoretical and ideal scenario, and in the absence of any measurement errors, this distance should be reduced and made minimal when the projection is operated with the optimal calibration parameters.

The distance measurement, which forms the cost function of the optimization sequence, can be established in a number of ways. For example, the barycenter of the close points of each list can be calculated. The cost function can then correspond to the combination (for example, the sum) of the Euclidean distances between all the possible pairs of barycenters. In general, a combination (for example, a sum or product) of the existing distance between 2 lists of close points is calculated for all the possible combinations of pairs of lists. The distance between 2 lists of close points can be defined, in particular, as a Hausdorff distance. If the list of close points is made up of a single element, the Euclidean distance can be used directly.

In a next step S34 of the optimization sequence, the calibration parameters are adjusted according to the value of the distance measurement that has just been established with the aim of optimizing it. This adjustment may depend on the optimization method that has been chosen. It can be the establishment of a gradient, a projection, or can be random when the optimization method is based on a stochastic approach.

As has already been seen, the optimization sequence is repeated so as to determine the calibration parameters of the measuring system 5, and, in particular, those of the image capture device 3. An end criterion CF that must be satisfied in order to end the repetition of the optimization sequence is generally provided. This criterion can correspond to a predetermined number of iterations, but, more generally, the aim is to continue these iterations until a target cost value (here the distance value) is reached or until the cost and/or estimated parameters no longer vary significantly between two iterations.

The extrinsic parameters for calibrating the image capture device 3 are provided at the end of the method.

In a variant of the calibration method, a plurality of optimizations is carried out to determine only a part of the calibration parameters each time.

By way of example, during a first optimization, it is only possible to establish the rotation matrix $R_{36}$ while keeping the translation vector $T_{36}$ fixed during the adjustment step S34. It is possible to fix this vector to the rough estimate that can be made in the laboratory. During a second optimization, only the value of the translation vector $T_{36}$ is optimized, and the value of the rotation matrix $R_{36}$ is kept fixed at the value obtained at the end of the first sequence.

Whatever the number of optimizations deployed during the method, the calibration parameters obtained can be used to fusion the data of the measuring system 5 during future measurement campaigns. In this way, it is possible to provide 3D point clouds extracted from the 2D images supplied by the image capture device 3, with the points being precisely associated with information, for example, concerning color or temperature.

It should be noted that the method according to the present disclosure does not require a particular common scene (such as a target) and that any object or frame of reference identifiable in the images can be used. It should also be noted that the method does not require remission images to be created from the laser scanner 2 and can therefore be used for a wide variety of laser scanners 2. It should also be noted that this method does not require points, shapes, or characteristic objects to be matched directly between the data provided by the scanner and the data of the 2D images, as such a method is particularly difficult to implement and is unreliable because of the heterogeneous nature of the data handled.

Of course, the present disclosure is not limited to the embodiment described, and it is possible to add variants without departing from the scope of the invention as defined by the claims.

The invention claimed is:

1. A method for calibrating a measuring system including an image capture device, a laser scanner, and a positioning unit, the method comprising:
preparing at least two images provided by the image capture device, the images representing at least one common scene captured from different points of view, and preparing a 3D point cloud of the common scene created using the data provided by the laser scanner and by the positioning unit;
identifying at least one homologous point in the images, the homologous point corresponding to the same point of the common scene; and
performing an optimization sequence for determining at least one calibration parameter, the optimization sequence comprising at least one iteration of the following steps:
for each image, identifying, in the 3D point cloud, at least one close point that projects into a neighborhood of the homologous point of the image;
establishing a measurement of the distance separating the close points associated with the homologous point of the images; and
adjusting the calibration parameter according to the established measurement.

2. The method of claim 1, wherein an estimated value of the calibration parameter is used during a first iteration of the optimization sequence.

3. The method of claim 1, wherein the calibration parameter is a calibration parameter of the scanner device provided with respect to the positioning unit and for which the calibration parameter to be determined is a rotation matrix and/or a translation vector connecting a frame of reference associated with the image capture device to a frame of reference associated with the positioning unit.

4. The method of claim 1, wherein the calibration parameter is a rotation matrix and/or a translation vector connecting a frame of reference associated with the image capture device to a frame of reference associated with the laser scanner.

5. The method of claim 1, wherein the two images are acquired while the measuring system completes a trajectory comprising an outward portion and a return portion that correspond to one another.

6. The method of claim 1, wherein the preparation of the images comprises determining the location and the attitude of the measuring system at a capture moment of each image.

7. The method of claim 1, wherein the step of identifying at least one homologous point comprises determining characteristic points and characteristic point descriptors.

8. The method of claim 1, wherein the optimization sequence uses a simplex method, a gradient method, or a stochastic method.

9. The method of claim 1, wherein the at least one close point that projects into the neighborhood of the homologous point is identified by selecting, from the 3D point cloud, the point projecting closest to the homologous point.

10. The method of claim 1, wherein the at least one close point that projects into the neighborhood of the homologous point is identified by selecting, from the 3D point cloud, the points projecting in a perimeter of R pixels around the homologous point.

11. The method of claim 1, wherein the measurement of the distance is established using a barycenter calculation of the close points associated with each image.

12. The method of claim 1, wherein the measurement of the distance is established using a calculation of the Hausdorff distance between the close points of the images.

13. The method of claim 2, wherein the calibration parameter is a calibration parameter of the scanner device provided with respect to the positioning unit and for which the calibration parameter to be determined is a rotation matrix and/or a translation vector connecting a frame of reference associated with the image capture device to a frame of reference associated with the positioning unit.

14. The method of claim 2, wherein the calibration parameter is a rotation matrix and/or a translation vector connecting a frame of reference associated with the image capture device to a frame of reference associated with the laser scanner.

15. The method of claim 2, wherein the two images are acquired while the measuring system completes a trajectory comprising an outward portion and a return portion that correspond to one another.

16. The method of claim 15, wherein the preparation of the images comprises determining the location and the attitude of the measuring system at a capture moment of each image.

17. The method of claim 16, wherein the step of identifying at least one homologous point comprises determining characteristic points and characteristic point descriptors.

18. The method of claim 17, wherein the optimization sequence uses a simplex method, a gradient method, or a stochastic method.

19. The method of claim 18, wherein the measurement of the distance is established using a barycenter calculation of the close points associated with each image.

20. The method of claim 18, wherein the measurement of the distance is established using a calculation of the Hausdorff distance between the close points of the images.

* * * * *